Dec. 26, 1967     PO-LUNG LIANG     3,359,830
HYDROKINETIC POWER TRANSMISSION MECHANISM WITH SPEED
RATIO SENSITIVE CONTROL SIGNAL SOURCE
Filed Feb. 17, 1964     3 Sheets-Sheet 2
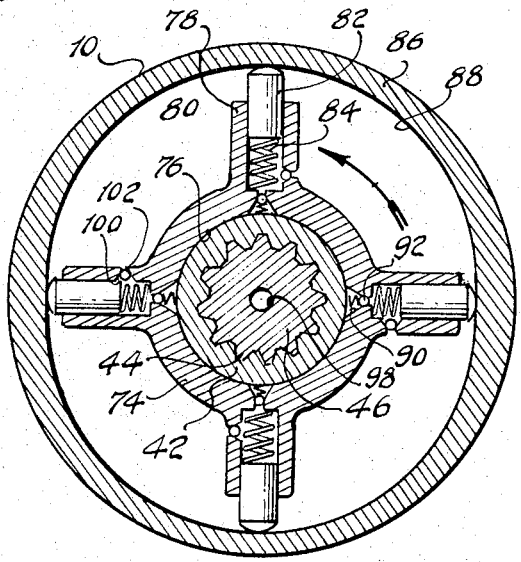
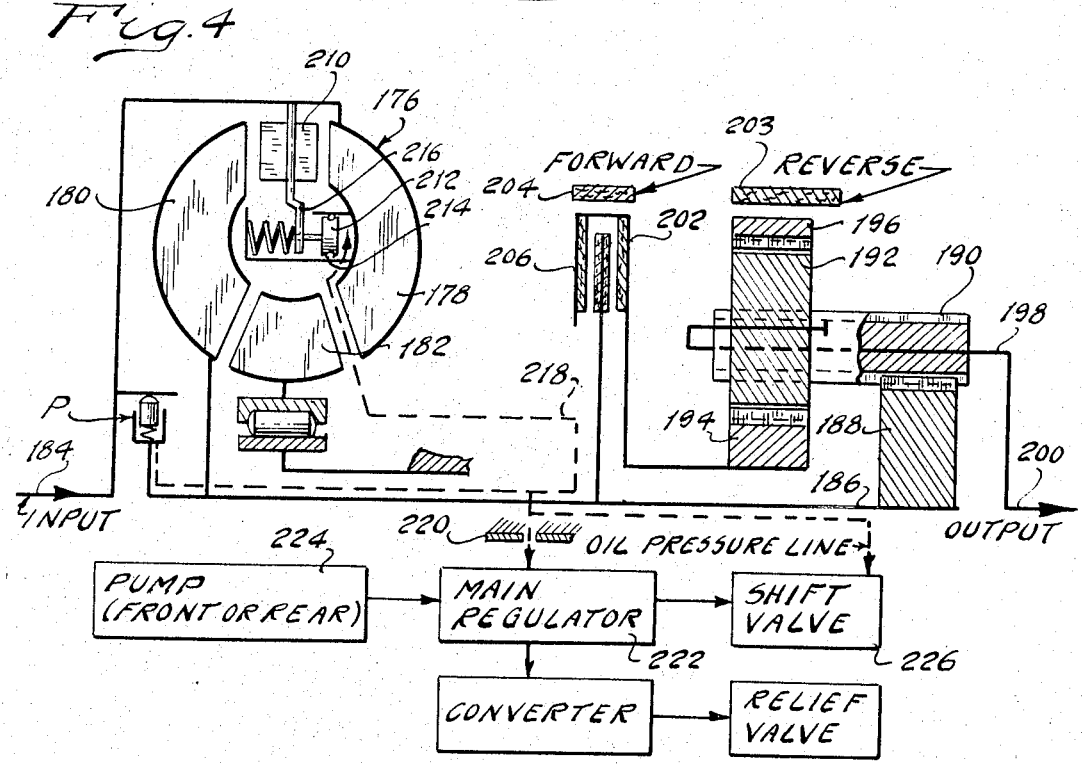
INVENTOR:
PO-LUNG LIANG
BY
ATTORNEYS.

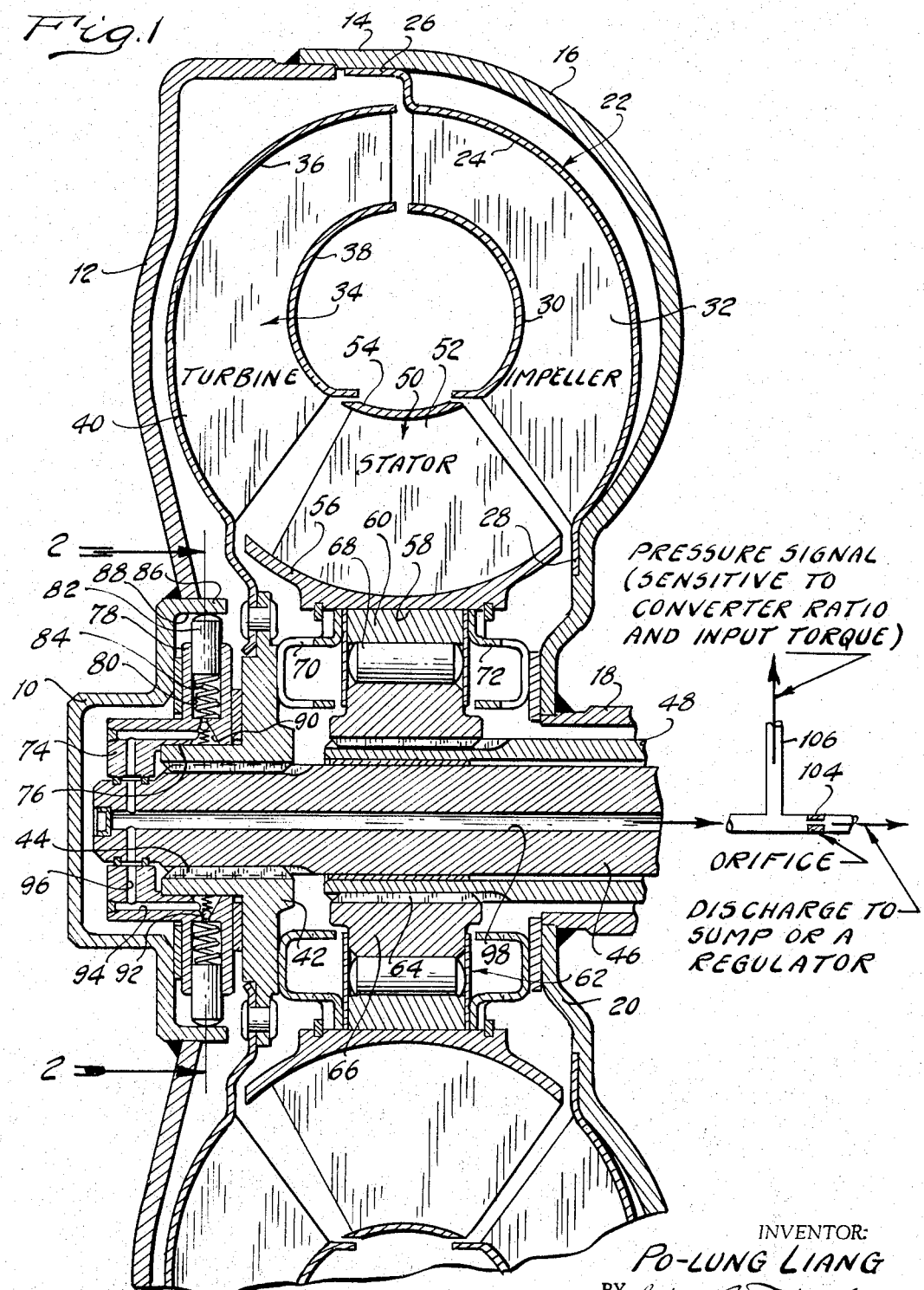

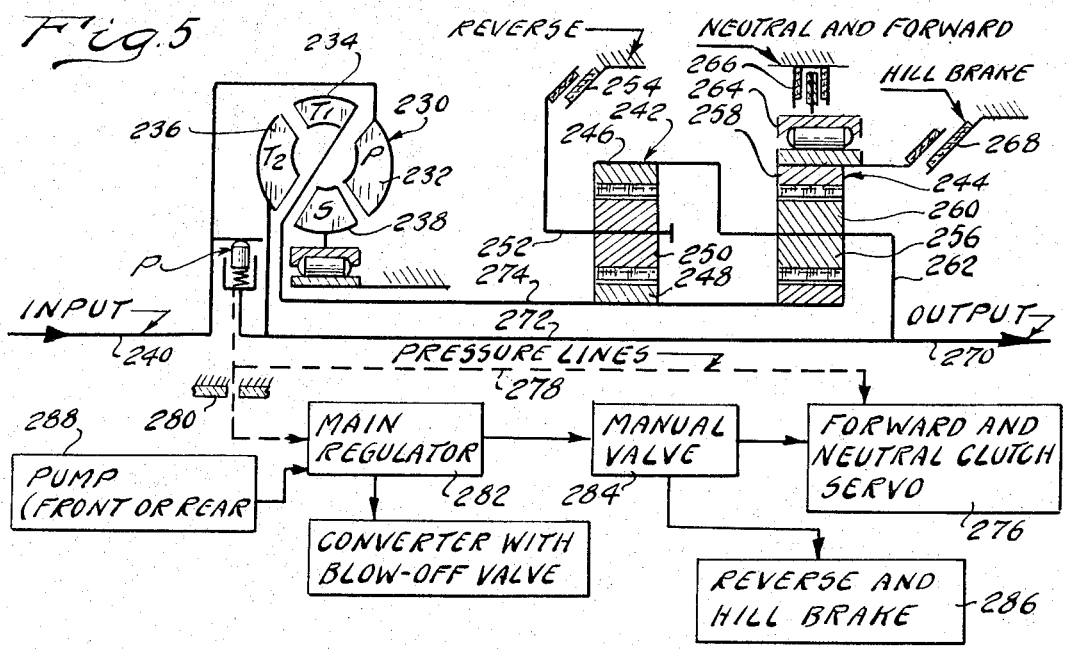
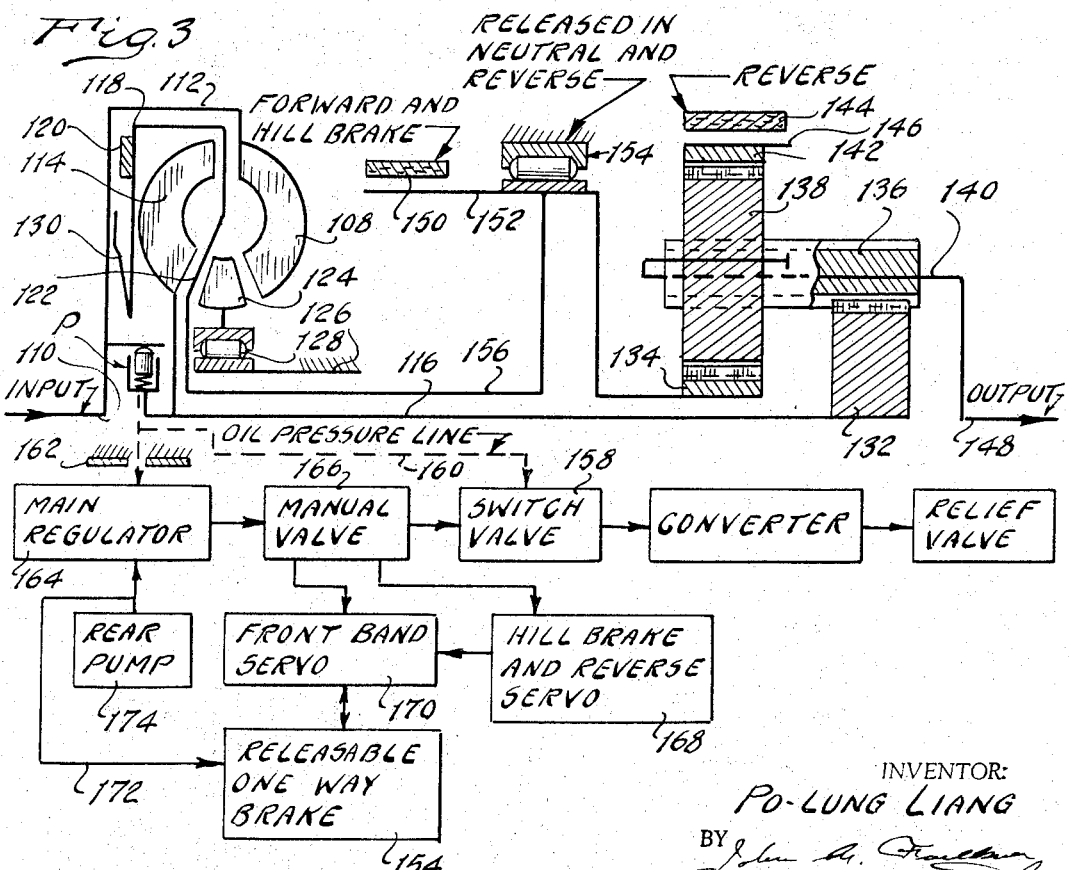

United States Patent Office 3,359,830
Patented Dec. 26, 1967

3,359,830
HYDROKINETIC POWER TRANSMISSION MECHANISM WITH SPEED RATIO SENSITIVE CONTROL SIGNAL SOURCE
Po-Lung Liang, Lincoln Park, Mich., assignor to Ford Motor Company, Dearborn, Mich., a corporation of Delaware
Filed Feb. 17, 1964, Ser. No. 345,331
6 Claims. (Cl. 74—731)

My invention relates generally to hydrokinetic power transmission mechanisms, and more particularly to a hydrokinetic torque converter mechanism in which control functions are initiated in response to variations in the magnitude of a pressure signal that is sensitive to the speed ratio of hydrokinetic members of the mechanism.

In a power transmission mechanism employing a hydrokinetic torque converter, a differential speed exists between the converter impeller and the converter turbine during operation in the torque conversion range. A pressure signal source in the form of a positive displacement pump is utilized for sensing the differential speed between the turbine and the impeller. This is done by connecting driving portions of the pump to the impeller and driven portions of the pump to the turbine. The fluid discharge of the pump therefore is related functionally in magnitude to the speed differential.

In a preferred embodiment of my invention, the fluid discharged from the signal pump is passed through a flow restricting orifice to create a pressure differential across the orifice that is an indicator of the speed ratio of the converter. This pressure differential in turn may be utilized by the automatic control valve system for initiating speed ratio changes in the associated multiple speed ratio gear system.

In a conventional hydrokinetic power transmission mechanism, it is usual practice to employ an automatic control valve system with a multiple speed ratio gear arrangement for initiating speed ratio changes. A so-called shift valve that forms a part of the control valve system responds to a driven speed signal and an engine torque demand signal so that a speed ratio change will be initiated at the proper so-called shift point as the driven member of the mechanism is accelerated from a standing start. In my improved system, however, the hydrokinetic torque ratio sensitive pressure signal may be used in lieu of the governor signal and the torque demand signal for establishing the speed ratio shift sequence.

The provision of a mechanism of the type above set forth being a principal object of my invention, it is a further object to provide a hydrokinetic power transmission mechanism having a speed ratio sensitive pressure signal wherein provision is made for utilizing that signal to energize a converter blade angle controlling servo. In this way the characteristics of the converter can be altered in proper timed relationship to the driving power demands thereby establishing optimum low speed ratio performance operation as well as high efficiency cruising operation.

In an alternate embodiment of my invention, I contemplate that multiple turbines may be employed and that the pressure signal will be sensitive to the differential speeds of multiple turbines of a hydrokinetic torque converter mechanism that is used in combination with a multiple speed ratio gear system. The clutch and brake means for controlling the relative speeds of the elements of the gear system can be applied or released when the relative differential speed of the turbines reaches a predetermined design value. The provision of a mechanism of this type is a further object of my invention.

It is another object of my invention to provide a system of the type above set forth wherein the differential speed sensitive pump may be utilized also as a source of pressure in the control system for a multiple speed ratio gear arrangement.

Further objects and features of my invention will become apparent from the following description and from the accompanying drawings, wherein:

FIGURE 1 shows in cross sectional form a hydrokinetic torque converter having a speed ratio sensitive pressure signal pump;

FIGURE 2 is a transverse cross sectional view taken along the plane of section line 2—2 of FIGURE 1;

FIGURE 3 shows in schematic form a modified form of my invention in which a direct-drive lock-up clutch is utilized in combination with a gear system to establish direct-drive operation;

FIGURE 4 is a schematic view of a modified hydrokinetic power transmission mechanism having an auxiliary impeller flow exit section that responds to variations in the magnitude of pressure signal made available by the speed ratio sensitive pump of FIGURES 1 and 2; and FIGURE 5 is a multiple turbine hydrokinetic power transmission mechanism wherein a speed differential sensitive pump is drivably associated with the multiple turbines to produce a pressure signal that is related in magnitude to the differential speeds of the turbines.

Referring first to FIGURE 1, numeral 10 designates a drive flange that may be connected drivably to the crankshaft of an internal combustion vehicle engine in an automotive vehicle driveline. It is drivably coupled to a drive shell part 12 which is secured at its periphery to the outer periphery 14 of a torque converter impeller shell part 16. The shell part 16 and the part 12 cooperate to define an integral impeller shell assembly.

A sleeve shaft 18 is drivably connected to the hub 20 of the shell part 16. Sleeve 18 in turn may be rotatably journaled within a relatively stationary transmission housing, not shown.

A bladed impeller is designated generally by reference character 22. It includes an outer shroud 24 that is welded at its outer periphery 26 to the outer peripherial portion of the impeller shell part 16. It is welded also at its inner hub 28 to the hub 20 of the shell part 16.

The impeller includes also an inner shroud 30 and blades 32 that are situated between the shrouds 30 and 24 to define radial outflow passages.

The impeller 32 is situated in juxtaposed fluid flow relationship with respect to a turbine identified generally by reference character 34. The turbine includes an outer shroud 36, an inner shroud 38 and turbine blades 40 located between the shrouds 36 and 38 to define radial inflow passages.

The outer shroud 36 is connected to a turbine hub 42 which is splined at 44 to a central turbine shaft 46. The shaft 42 in turn can be connected to a turbine driven member such as a power input gear element of the gear system.

A stationary stator sleeve shaft 48 surrounds turbine shaft 46 and is connected directly to a stationary transmission housing.

A bladed stator 50 is situated between the flow exit region of the turbine 34 and the flow entrance region of the impeller 22. It includes stator blades 52 adapted to direct the toroidal fluid flow from the turbine flow exit to the impeller flow entrance while increasing the magnitude of the tangential component of the absolute fluid flow velocity vector in the direction of rotation of the impeller.

The bladed passages of the stator are defined in part by a first shroud 54 and a second shroud 56. The latter shroud is formed with a central opening 58 within which is received an outer race 60 for an overrunning brake identified generally by reference character 62.

Brake 62 includes also an inner race 64 that is splined at 66 to sleeve shaft 48. One of the races 60 or 64 can be keyed to provide camming action with a series of rollers 68 thereby inhibiting rotation of the stator in a direction opposite the direction of rotation of the impeller while accommodating freewheeling motion thereof in the opposite direction.

A spacer in the form of a thrust element 70 is situated between the hub 42 and the races 60 and 64. Similarly, another spacer or thrust element 72 is situated between races 60 and 64 and the hub 20 of the shell part 16.

A radial pump body 74 is formed with an opening 76 which receives an extension of the hub 42. It is supported by hub 42 with a press fit so that the body 74 and the hub 42 rotate in unison. A plurality of cylinders 78 project radially from the body 74, each one being formed with a cylindrical opening 80 within which is positioned a radially movable piston 82. A spring 84 is situated between the radially inward end of the opening 80 and the piston 82 to urge normally the piston 82 in a radially outward direction.

The drive flange 10 includes a cam ring 86 with an internal cam surface 88 which is engaged by pistons 82. Cam surface 88 may be in the form of an oval and its principal axis may correspond to the axis of rotation of body 74. It thus is apparent that the pistons 82 will reciprocate within their respective cylindrical openings as the body 74 rotates relative to cam ring 86.

The radially inward end of each opening 80 communicates with a fluid discharge port 90. A check valve 92 normally closes the port 90 although it is adapted to be unseated as the piston 82 moves in a radially inward direction. A pressure delivery passage 94 communicates with the port 90 and with a radial passage 96 formed in the body 74. This passage in turn communicates with a central passage 98 formed in the turbine shaft 46.

The radially inward portion of the cylindrical opening 80 is in fluid communication with a fluid intake port 100 within which is situated a ball check valve 102. This valve prevents discharge of fluid from the chamber 80 when the piston 82 moves radially inwardly although it admits fluid into the chamber 80 as the piston 82 moves radially outwardly. Each of the chambers 80 communicates with the central passage 98 in the manner illustrated in FIGURE 1.

It will be apparent, therefore, that as the impeller overruns the turbine, relative motion will take place between ring 86 and the pump body 74 thereby establishing fluid pumping action. The fluid discharged by the pump is delivered to the passage 98. It then is passed through a flow restricting orifice 104 which establishes a pressure differential. The low pressure side of the orifice 104 communicates with a low pressure sump region or with the intake side of a pressure regulator valve. The pressure on the upstream side of the orifice 104 is utilized as a pressure signal which is delivered to various circuit regions through a pressure signal passage 106. The magnitude of the pressure in passage 106 is sensitive to the converter speed ratio and hence to the input torque.

This pressure signal may be utilized in various ways to establish control functions. For example, it may be utilized in an environment of the type shown in FIGURE 3 wherein the differential speed sensitive pump is identified by the symbol P. The converter with which the pump P is associated includes an impeller 108 that is drivably connected to a power input shaft such as an engine driven crankshaft 110. This connection is established by a drive shell 112.

The torque converter turbine is shown at 114. It in turn is drivably connected to a turbine driven shaft 116.

A lock-up clutch is included also within the torque converter structure. It includes a clutch element 118 which carries a friction disc 120 situated in close proximity to a friction surface formed by impeller shell 112. Clutch element 118 is connected to a spider member 122 which traverses the torus circuit of the converter. It includes portions that extend through the annular gap formed between the flow exit section and the flow entrance section of the turbine. It includes also a portion that extends through the annular gap between the flow exit section of the turbine and the flow entrance section of the stator. The stator is indicated by reference character 124.

The stationary stator shaft 126 supports the stator 124. An overrunning brake 128 provides a one-way torque delivery path between the stator 124 and the stator shaft 126.

A leaf type spring disc 130 is situated between impeller shell 112 and the clutch element 118. It provides a permanent drag between the element 116 and the shell 112 for reasons that will be discussed subsequently.

A two-speed planetary gear system is employed in conjunction with the torque converter of FIGURE 3. It includes a first relatively large pitch diameter sun gear 132 and a cooperating relatively reduced pitch diameter sun gear 134. Sun gear 132 drivably engages a series of long planet pinions 136 and sun gear 134 engages a series of short planet pinions 138. The pinions 136 and 138 are carried by a common carrier 140 and rotate relative thereto. Pinions 136 and 138 also engage each other.

A ring gear 142 is engaged by planet pinions 138. A reverse brake band 144 surrounds a brake drum 146 which is connected to the ring gear 142. Brake band 144 can be applied and released by means of a suitable fluid pressure operated servo in known fashion to anchor selectively the ring gear 146. Carrier 140 is connected drivably to power output shaft 148.

Sun gear 134 can be braked by a forward and hill brake friction brake band 150 which surrounds a brake drum 152 connected directly to the sun gear 134. Brake band 150 can be applied and released by means of suitable fluid operated servos in known fashion. A releasable overrunning brake 154 also can be employed for anchoring sun gear 134. Provision may be made for rendering the overrunning brake 154 inoperative during operation in neutral and reverse. During operation in low speed forward driving ratio, however, overrunning brake 154 prevents rotation of the sun gear 134 and accommodates torque reaction. Brake 154 can be applied and released by employing fluid pressure operated elements of the type disclosed in N. T. General et al., Patent No. 3,054,488, which is assigned to the assignee of my instant invention.

To establish low-speed ratio forward drive operation it merely is necessary to condition the brake 154 for accommodating torque reaction. Turbine torque then is delivered from turbine 114 through shaft 116 to the sun gear 132. With the sun gear 134 acting as a reaction member, the carrier 140 and the power output shaft 148 are driven in a forward driving direction at a reduced speed relative to the speed of shaft 110.

To establish high-speed ratio direct drive operation it merely is necessary to engage the direct drive clutch shown in part at 120. When this occurs a direct connection is established between shaft 110 and a torque delivery shaft 156 which surrounds turbine shaft 116. Shaft 156 is connected directly to the clutch member 118 and to the brake drum 152. The torque of shaft 110 then is delivered directly to shaft 156 and to the sun gear 134. This power flow path is entirely mechanical. The balance of the power is delivered hydrokinetically from turbine 114 through shaft 116 to the sun gear 132. This establishes a substantially direct drive ratio in the gear system.

The converter clutch can be engaged and released in the manner described in United States Patent No. 3,252,- 352, which is assigned to the assignee of my instant invention. This is done by controlling the direction of the oil flow through the torus circuit of the hydrokinetic torque converter. If the fluid is delivered through the torque converter in a radially outward direction between clutch member 118 and the shell 112 across the disc 120, the lock-up clutch will be disengaged. When the fluid passes in this direction it may be returned through the passage arrangement that is defined in part by the concentric sleeve shafts 126 and 156. On the other hand, if the direction of fluid flow is reversed, with the converter return flow passing radially inwardly across the friction disc 120, a pressure differential will be created at this point thereby causing the clutch member 118 to engage frictionally the shell 112 under the influence of the static pressure in the torus circuit of the converter.

The direction of the converter fluid flow is controlled by a switch valve 158 which is sensitive to the pressure developed by the pump P. A pressure signal is delivered to the switch valve 158 through a signal pressure passage 160.

Reference may be made to the copending application of Po-Lung Liang and Norman T. General for the purpose of providing a more complete understanding of the function of the switch valve in controlling the direction of fluid flow through the hydrokinetic torque converter.

The discharge of the pump P is delivered through a flow restricting orifice 162. It then is delivered to a main regulator valve 164. The main regulator valve in turn distributes a controlled pressure to a driver controlled manual valve 166. By appropriately positioning the manual valve 166, fluid pressure can be made available to the reverse brake band servo 168 or the forward and hill brake reverse brake band servo 170.

During operation of the mechanism under low speed ratio forward drive conditions, the forward brake band 150 is applied. Under these conditions, fluid pressure from the front brake band servo 170 is distributed to the releasable one-way brake 154 thereby rendering it inoperable. The actuating pressure for the brake 154 is obtained, however, from the main regulator valve 164 through a pressure supply passage 172.

The converter is supplied with fluid in the manner illustrated in the block diagram of FIGURE 3. The toroidal fluid pressure is limited by means of a relief valve in a conventional fashion.

In the embodiment shown in FIGURE 3, I contemplate that the brake 154 may be spring released. The front brake band 150 is released after brake 154 is applied by the signal received by a power output shaft driven rear pump 174.

In the environment shown in FIGURE 3 the pump P may act as a pressure supply source for the control system. If the transmission gear system is conditioned for neutral operation, however, there is a tendency for the turbine speed to be reduced relative to the impeller speed by reason of the dragging action provided by the leaf spring 130. This increases the speed differential between the impeller and the turbine and thus it is possible to maintain an adequate pumping action in the pump P. The pump P then can act as a source of fluid pressure for the control system even when the transmission gear system is in neutral.

In FIGURE 4 I have illustrated another environment that may utilize the pressure signal supplied by the differential speed sensitive pump of FIGURES 1 and 2. Again the pump is identified in FIGURE 4 by the symbol P. The environment of FIGURE 4 includes a torque converter mechanism 176 having a bladed impeller 178, a bladed turbine 180 and a bladed stator 182. Impeller 178 is drivably connected to a power input shaft in the form of a crankshaft 184.

The turbine is drivably connected to a turbine shaft 186 and the pump P, like the corresponding pump structure shown in FIGURES 1 and 2, is sensitive to the differential speed of the shaft 186 and the shaft 184.

Shaft 186 is connected drivably to a sun gear 188 which meshes with long planet pinions 190. These pinions engage with short planet pinions 192. A small pitch diameter sun gear 194 engages pinions 192. A ring gear 196 also engages pinions 192. Pinions 190 and 192 engage each other. They are rotatably mounted upon a common carrier 198 which is connected drivably to power output shaft 200.

Reverse friction brake band 202 surrounds ring gear 196 and may be applied and released selectively by means of a suitable fluid pressure operated servo in known fashion to provide torque reaction during reverse drive operation.

Sun gear 194 is connected drivably to a reaction brake drum 202 which is surrounded by a forward drive friction brake band 204. This brake band can be applied and released also by means of a suitable fluid pressure operated servo. A fluid pressure operated servo friction clutch 206 is used for establishing selectively a driving connection between shaft 186 and sun gear 194.

To establish forward drive low speed ratio operation it merely is necessary to anchor the sun gear 194 with the brake band 204. Turbine torque then is delivered from turbine 180 through shaft 186 to sun gear 188. With the sun gear 194 acting as a reaction member the carrier 198 and the shaft 200 are driven at a reduced speed in a forward driving direction.

Reverse drive operation is obtained by anchoring ring gear 196 by means of brake band 203. Turbine torque delivered to sun gear 188 then causes carrier 198 and power output shaft 200 to rotate at a reduced speed in a reverse direction.

Direct drive high speed ratio operation in the forward driving direction is accomplished by engaging clutch 206. This establishes a direct connection between sun gears 194 and 188.

The impeller 178 includes a bladed flow exit section identified generally by reference character 210. The angularity of the blades of section 210 can be adjusted by means of a centrally disposed fluid pressure operated servo comprising a piston 212 and a cylinder 214. Cylinder 214 is carried by the inner shroud of the impeller 178 within the torus region of the converter. The mechanical connection is established between piston 212 and the blades of the section 210. This connection includes offset cranks 216. For a more particular description of an adjustable impller exit section of this type, refernce may be made to United States Patent No. 3,199,377 which is assigned to the assignee of my instant invention.

The signal obtained by the pump P can be distributed through suitable internal passage structure identified by reference character 218. This passage structure extends to one side of the piston 212 thereby urging it in a left-hand direction as viewed in FIGURE 4 to adjust the angularity of the bladed section 210.

The signal of pump P, as in the previous embodiments, is distributed through an orifice 220 to the various control valve members. These members include a main regulator 222 which receives pressure from pump P and regulates it at a desired value. An auxiliary pump 224, which is driven by a power input or power output member of the transmission system, is used to supplement the action of the pump P in supplying pressure to the main regulator 222.

A shift valve 226 is supplied with pressure by the main regulator. The shift valve in turn controls the action of brake band 204 and the clutch 206 to initiate speed ratio changes.

The main regulator distributes fluid under reduced pressure to the converter and the upper limit of the pressure is controlled by a relief valve in the usual fashion.

The angularity of the blades 210 thus can be changed at the appropriate converter speed ratio to provide maximum cruising efficiency and maximum high speed ratio efficiency. At the same time the adjustable bladed section 210 will respond to the signal of pump P to provide an angularity that will be favorable to high torque ratio performance during operation of the converter at low speed ratios. The torque ratio carryout of the converter thus can be augmented in this fashion and the transmission system then is capable of meeting an increased range of load requirements. This action is accomplished without the use of a conventional governor or torque demand throttle valve of the type normally found in automatic transmission control systems.

In FIGURE 5 I have illustrated a transmission mechanism that utilizes a pump of the type shown in FIGURES 1 and 2 to provide a signal that is sensitive to the differential speed of multiple turbines. This arrangement includes a torque converter 230 having an impeller 232, a first turbine 234, a second turbine 236 and a bladed stator 238. The turbine, the impeller and the stator are situated in a toroidal fluid flow relationship in the usual fashion. The impeller 232 is drivably connected to a power input shaft in the form of an engine driven crankcase 240.

The converter 230 is used in combination with a pair of simple planetary gear units 242 and 244. Unit 242 includes a ring gear 246, a sun gear 248, planet pinions 250 and a carrier 252 upon which the pinions 250 are journaled. The carrier 252 can be braked by means of a selectively engageable reverse brake 254 during reverse drive operation.

Gear unit 244 includes a sun gear 256, a ring gear 258, planet pinions 260 and a carrier 262 for rotatably journaling the pinions 260. Carrier 262 is connected drivably to the ring gear 246. Ring gear 258 can be anchored during forward drive operation by means of a one-way brake 264. This brake can be disabled during reverse drive operation, however, by means of a releasable friction clutch 266. If hill braking is desired, a selectively engageable hill brake 268 can be provided for anchoring ring gear 258. Brake 268 is capable of accommodating torque reaction in either direction although the one-way brake 264 is suitable for accommodating torque reaction in the forward driving direction only.

Carrier 262 is connected to power output shaft 270. Turbine 236 is connected directly to power output shaft 270 through a central turbine shaft 272. Turbine 234 is connected drivably to the common sun gears 248 and 256 by means of a turbine sleeve shaft 274.

During operation from a standing start, torque initially is delivered principally from turbine 234 to sun gear 256. Ring gear 258 acts as a reaction member and the power output shaft 270 thus is driven at a reduced speed ratio. The torque contribution provided by the turbine 236 is distributed directly to the shaft 270. As the speed ratio increases, the turbine 236 becomes the principal driving member and its torque is distributed directly to the power output shaft 270. Under these conditions the turbine 234 tends to overspeed the turbine 236. The hydrokinetics of the converter are such that the fluid flow normally would tend to drive the turbine T2 in a forward driving direction at a speed faster than the gear ratio of the gear system normally would permit. Thus, an undesirable hydrokinetic drag is established unless the gear system can be rendered inoperative. This is done by releasing the neutral and forward clutch 266 at the instant that the turbine 234 becomes nonfunctional.

In order to initiate properly the release of the clutch 266, it is necessary to provide a signal that is sensitive to the over-all speed ratio of the converter. This is obtained by pump P which again corresponds to the speed ratio sensitive pump of FIGURES 1 and 2. The output pressure of the pump P is distributed directly to the forward and neutral clutch servo 276 through a second passage 278.

The discharge fluid of the pump P is distributed as before through a flow restricting orifice 280 and then to a main regulator valve 282. This valve distributes regulated pressure to the driver controlled manual valve 284 which in turn supplies pressure to both the servo 276 and to the reverse and hill brake servos 286.

An auxiliary pump, which may be connected to a driving or driven member of the transmission system, is shown at 288. It may be used to supplement the action of the pump P and to supply the control system with control pressure although I contemplate that the pump P may be used also as the sole pressure source.

Having thus described a preferred embodiment of my invention, what I claim and desire to secure by U.S. Letters Patent is:

1. In a power transmission mechanism having a hydrokinetic torque converter, multiple ratio gearing, a converter speed ratio sensitive pressure source comprising a first fluid displacement member drivably connected to driving portions of said mechanism, a second fluid displacement member cooperating with said first fluid displacement member, said second fluid displacement member being drivably connected to driven portions of said mechanism, passage means for distributing a pressure signal from said fluid displacement members to pressure sensitive portions of said mechanism, said pressure sensitive portions including fluid pressure operated servo means for controlling the motion of said gearing to effect ratio changes, valve means for controlling distribution of pressure to said servos through said passage means, said first fluid displacement member comprising a cam ring, said second fluid displacement member comprising a pump body, radially movable pumping members carried by said body in camming engagement with said cam ring whereby said pumping members are moved radially upon relative movement of said cam ring with respect to said pump body, radial openings receiving said pumping members, said passage means communicating with radially inward regions of said openings, and a flow restricting orifice forming a part of said passage means thereby creating a pressure differential thereacross, said servos being located on the downstream side of said orifice and said valve means being located on the upstream side of said orifice, said valve means responding to changes in the pressure developed by said ratio sensitive pressure source.

2. In a hydrokinetic power transmission mechanism comprising multiple ratio gearing, an impeller and a turbine situated in toroidal fluid flow relationship, a positive displacement pump comprising relatively movable fluid displacement members, one fluid displacement member being connected to said impeller and the other fluid displacement member being connected to said turbine, means for supplying fluid under low pressure to said displacement members, passage means for delivering fluid displaced by said members upon relative movement thereof to fluid pressure sensitive portions of said mechanism, said fluid pressure sensitive portions including fluid pressure operated servo means for controlling the motion of said gearing to effect ratio changes, valve means for controlling distribution of pressure to said servos through said passage means, the fluid displaced by said members functioning as a pressure signal that is proportional in magnitude to the speed ratio of said mechanism, said first fluid displacement member comprising a cam ring, said second fluid displacement member comprising a pump body, radially movable pumping members carried by said body in camming engagement with said cam ring whereby said pumping members are moved radially upon relative movement of said cam ring with respect to said pump body, radial openings receiving said pumping members, said passage means communicating with radially inward regions of said openings, and a flow restricting orifice forming a part of said passage means thereby creating a pressure differential thereacross, said servos being located on the downstream side of said orifice and said valve means being located on the upstream side of said orifice, said valve means responding to the pressure developed by said positive displacement pump.

3. In a power transmission mechanism having a hydrokinetic torque converter with bladed members, a converter speed ratio sensitive pump comprising a first fluid displacement member drivably connected to driving portions of said mechanism, a second fluid displacement member cooperating with said first fluid displacement member, said second fluid displacement member being drivably connected to driven portions of said mechanism, one of the bladed members of said torque converter having an adjustable bladed section, servo means for adjusting the angularity of said bladed section, and passage means for distributing a pressure signal from said speed ratio sensitive pump to said servo to initiate a change in the angularity of said bladed section as the over-all speed ratio of said mechanism assumes a given value.

4. In a hydrokinetic power transmission mechanism comprising an impeller and a turbine situated in toroidal fluid flow relationship, a positive displacement pump comprising relatively movable fluid displacement members, one fluid displacement member being connected to said impeller and the other fluid displacement member being connected to said turbine, means for supplying fluid under low pressure to said displacement members, the fluid displaced by said members functioning as a pressure signal that is proportional in magnitude to the speed ratio of said mechanism, one of the bladed members of said torque converter having an adjustable bladed section, servo means for adjusting the angularity of said bladed section, and passage means for distributing a pressure signal from said speed ratio sensitive pump to said servo to initiate a change in the angularity of said bladed section as the over-all speed ratio of said mechanism assumes a given value.

5. In a power transmission mechanism having a hydrokinetic torque converter, a converter speed ratio sensitive pressure source comprising a first fluid displacement member drivably connected to driving portions of said mechanism, a second fluid displacement member cooperating with said first fluid displacement member, said second fluid displacement member being drivably connected to driven portions of said mechanism, passage means for distributing a pressure signal from said fluid displacement members to pressure sensitive portions of said mechanism, a multiple speed ratio gear system cooperating with said hydrokinetic mechanism to establish plural torque delivery paths, direct drive clutch structure between said driving member and portions of said gear system, and friction means between driven portions of said direct drive clutch structure and said impeller for retarding the speed of rotation of said turbine when said gear system is inoperative thereby maintaining a speed differential for said fluid displacement members.

6. In a hydrokinetic power transmission mechanism comprising an impeller and a turbine situated in toroidal fluid flow relationship, a positive displacement pump comprising relatively movable fluid displacement members, one fluid displacement member being connected to said impeller and the other fluid displacement member being connected to said turbine, means for supplying fluid under low pressure to said displacement members, passage means for delivering fluid displaced by said members upon relative movement thereof to fluid pressure sensitive portions of said mechanism, the fluid displaced by said members functioning as a pressure signal that is proportional in magnitude to the speed ratio of said mechanism, a multiple speed ratio gear system cooperating with said hydrokinetic mechanism to establish plural torque delivery paths, direct drive clutch structure between said driving member and portions of said gear system, and friction means between driven portions of said direct drive clutch structure and said impeller for retarding the speed of rotation of said turbine when said gear system is inoperative thereby maintaining a speed differential for said fluid displacement members.

References Cited

UNITED STATES PATENTS

| | | | |
|---|---|---|---|
| 2,373,453 | 4/1945 | Brunken | 74—731 |
| 2,603,984 | 7/1952 | Swift | 74—732 |
| 2,901,922 | 9/1959 | Baker | 74—687 |
| 3,182,775 | 5/1965 | Schall | 192—3.2 |

FOREIGN PATENTS

| | | |
|---|---|---|
| 446,979 | 5/1936 | Great Britain. |
| 181,173 | 11/1935 | Switzerland. |

ROBERT M. WALKER, *Primary Examiner.*

DAVID J. WILLIAMOWSKY, THOMAS C. PERRY,
*Examiners.*

J. R. BENEFIEL, *Assistant Examiner.*